United States Patent [19]

Scaramucci

[11] 4,230,139
[45] Oct. 28, 1980

[54] DISC VALVE

[76] Inventor: Domer Scaramucci, 3245 S. Hattie, Oklahoma City, Okla. 73129

[21] Appl. No.: 959,719

[22] Filed: Nov. 13, 1978

[51] Int. Cl.³ .............................................. F16K 13/04
[52] U.S. Cl. ..................................... 137/74; 251/173; 251/306
[58] Field of Search .................. 251/173, 306; 137/72, 137/74

[56] References Cited

U.S. PATENT DOCUMENTS

| | | | |
|---|---|---|---|
| 3,174,495 | 3/1965 | Anderson | 137/74 |
| 3,250,510 | 5/1966 | Williams | 251/173 |
| 3,282,558 | 11/1966 | Ewain | 251/173 |
| 3,290,001 | 12/1966 | Taylor | 251/306 X |
| 3,556,476 | 1/1971 | Haeuky | 251/306 |
| 4,044,994 | 8/1977 | Priese | 251/172 |

*Primary Examiner*—Harold W. Weakley

*Attorney, Agent, or Firm*—Dunlap, Codding & McCarthy

[57] ABSTRACT

A pressure actuated seat ring for a disc valve has a tubular, relatively flexible portion extending axially from a radially thicker, relatively inflexible portion. The flexible portion of the seat ring extends circumferentially about the disc of the valve when the valve is closed and a cavity is formed about the flexible portion such that fluid pressure in the cavity tends to force the flexible portion of the seat ring against the disc. The ends of the cavity are vented to the flow passage of the valve at opposite sides of the disc and an elastomeric sealing ring mounted on the tubular portion of the seat ring is movable within the cavity in response to a pressure differential at the vents to seal the vent exposed to the lower pressure so that the larger pressure is transmitted to the cavity.

15 Claims, 19 Drawing Figures

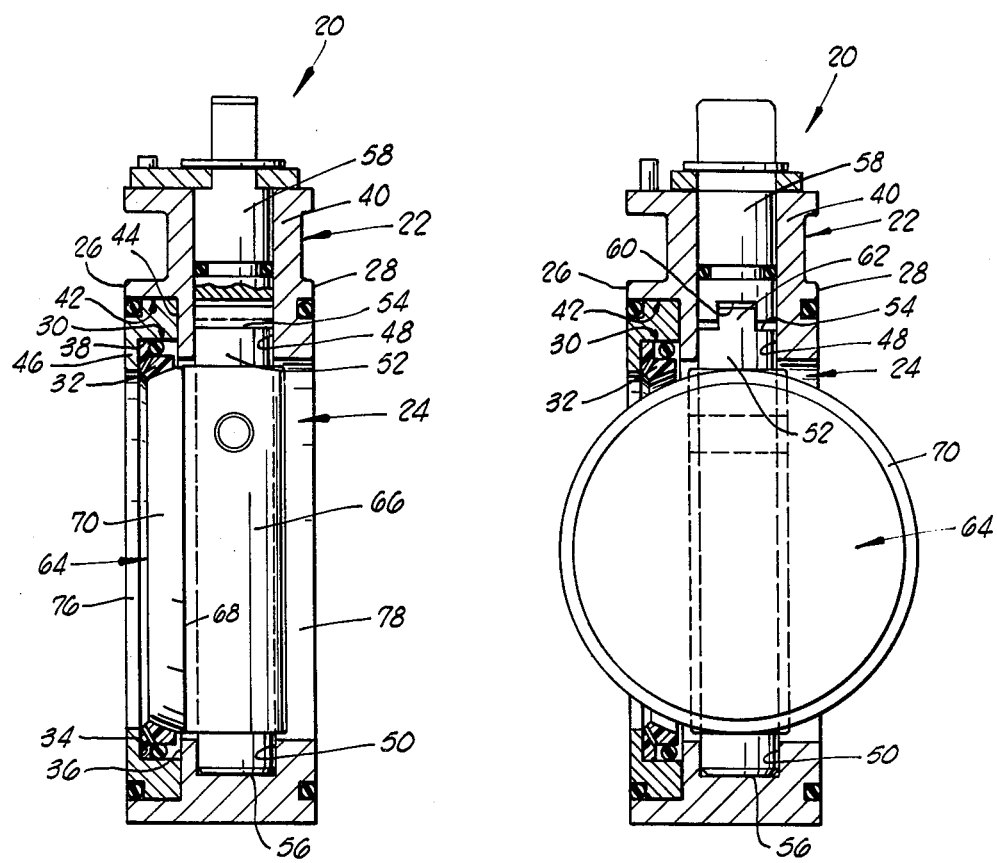
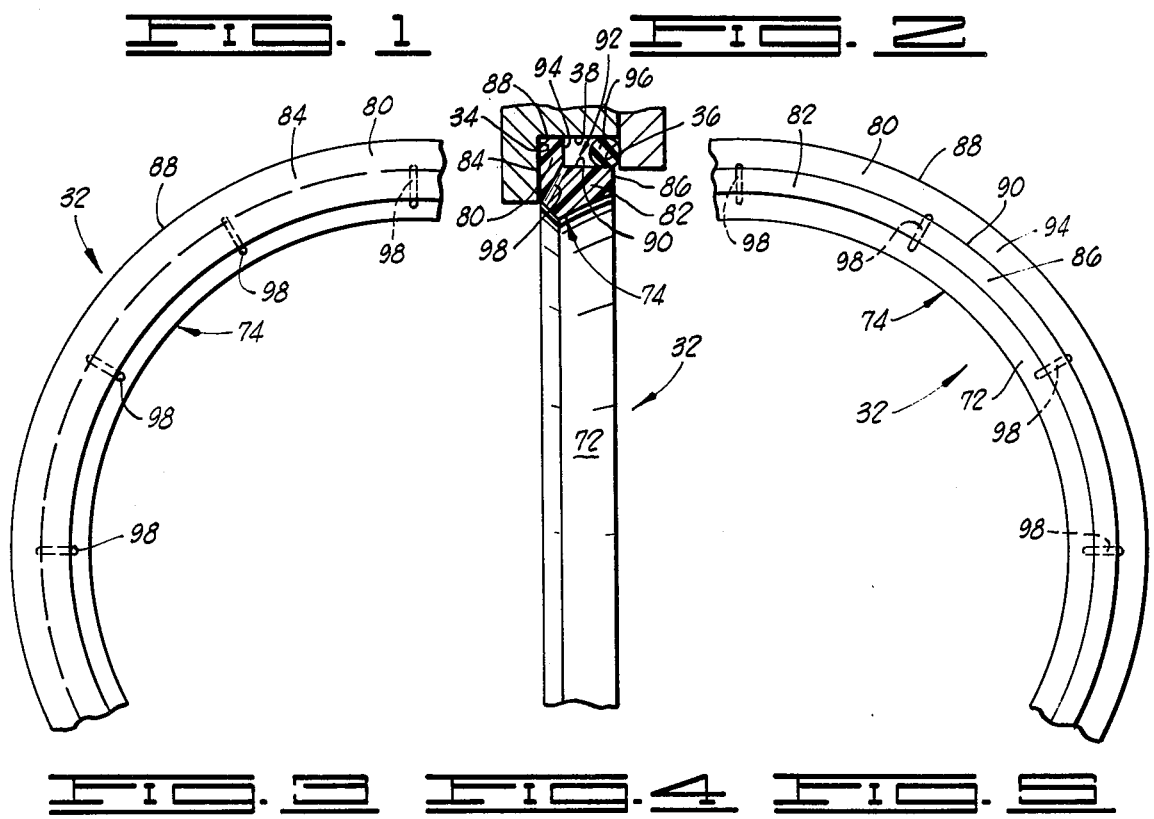

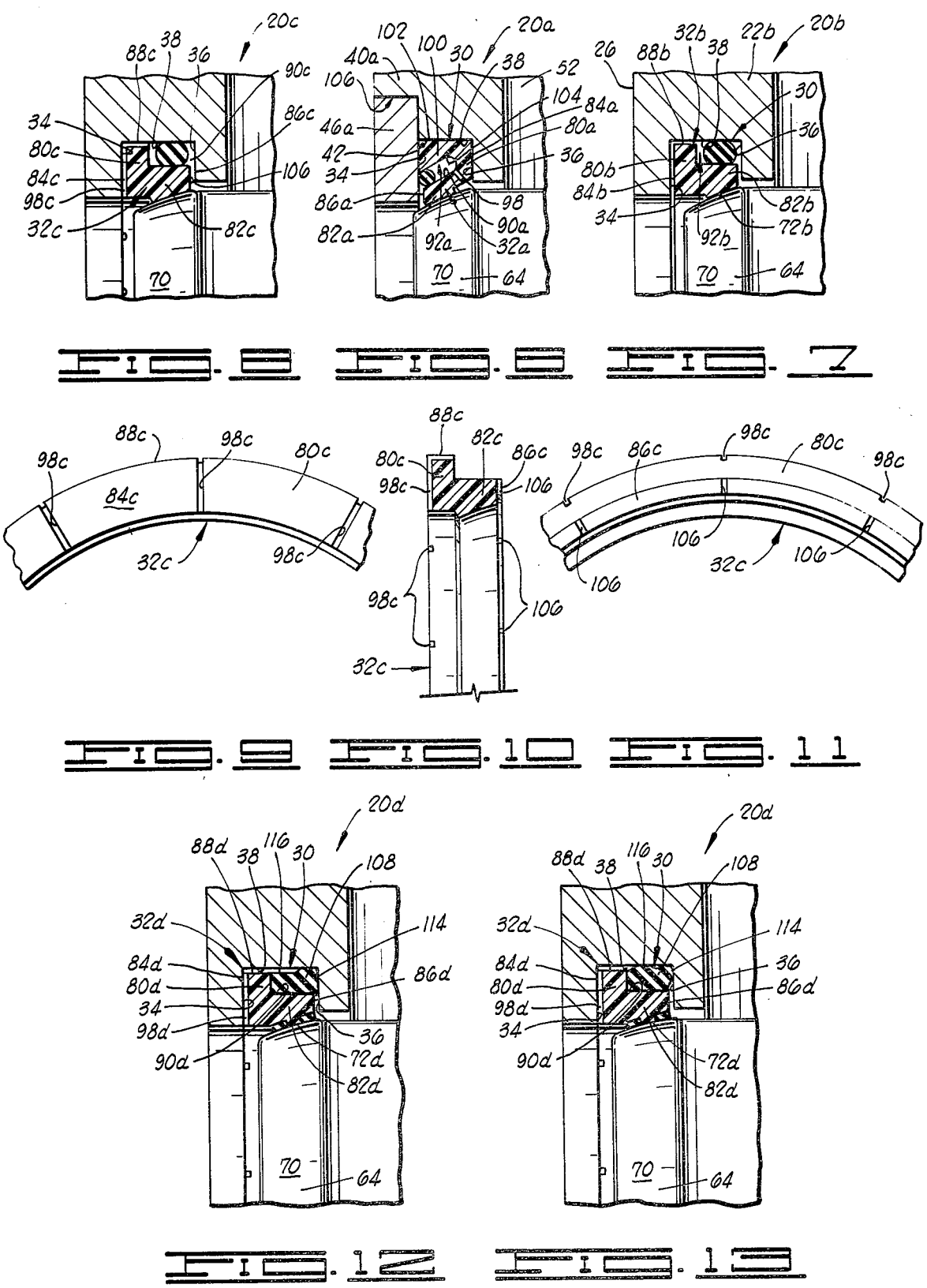

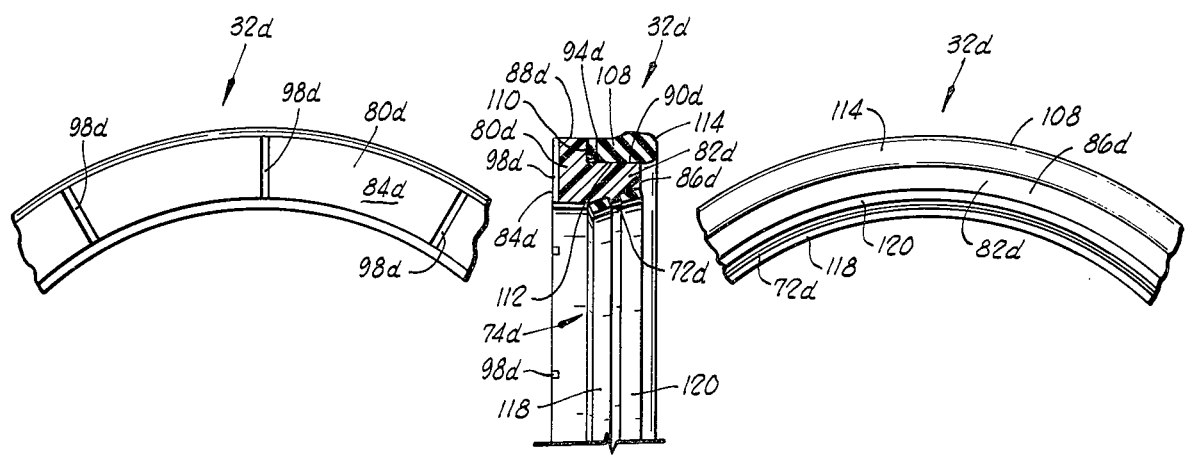
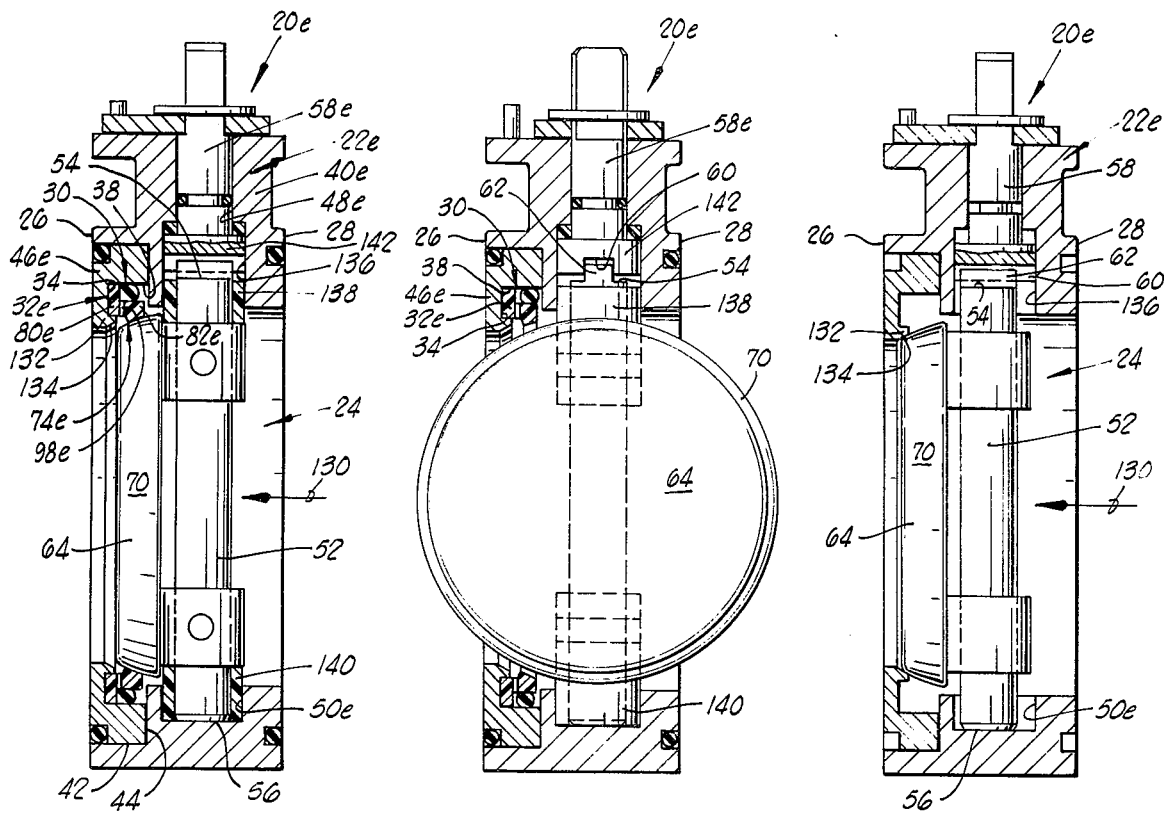

DISC VALVE

CROSS-REFERENCE TO RELATED APPLICATION

The subject matter of the present application is related to the subject matter disclosed in the applicant's co-pending United States Patent Application Ser. No. 865,853, abandoned filed Dec. 30, 1977, entitled "Fire Safe Disc Valve".

BACKGROUND OF THE INVENTION

1. Field of Invention

This invention relates generally to bi-directional valves having pressure actuated seats, and more particularly, but not by way of limitation, to bi-directional disc valves.

2. Discussion of the Prior Art

Disc valves are generally inexpensively manufactured and, accordingly, are in widespread use throughout the United States and the rest of the world. However, such valves have been subject to inherent limitations generally related to sealing of the valves. In particular, materials commonly used for seats in such valves; for example, polytetrafluoroethylene, are subject to cold flow so that, over a period of time, the seat takes a set which reduces the force with which the seat bears against the disc of a valve due to its own resilience.

In order to avoid leakage arising from the seat of a valve taking a set, it has become conventional to provide some means for urging the seat against the disc independently of the resilience of the material of which the seat is constructed. In particular, a difference in fluid pressure at inlet and outlet passages of the valve is commonly used to force the seat against the disc.

The use of the pressure differential across a valve for forcing the seat against the disc can result in another problem. To the extent that the seat is sufficiently flexible to effect a good seal, the possibility exists that the seat will be blown out of the seat pocket in the valve body by such differential. Thus, unless provision is made to prevent blowout, a disc valve generally cannot be used for high pressure service.

A conventional approach for constructing a disc valve for high pressure service is to narrow the opening of the seat pocket in which the seat is disposed. Such narrowing can be accomplished via flanges as in the sealing mechanism disclosed by Benware, U.S. Pat. No. 3,642,248, issued Feb. 15, 1972, or via converging pocket walls as in the valve disclosed by Maciulaitis et al., U.S. Pat. No. 4,088,299, issued May 9, 1978. Fluid pressure can be transmitted to the outer periphery of the seat via grooves in the sides of the seat (see Benware) or by shaping the seat to prevent seepage about the sides (see Maciulaitis). Wucik, U.S. Pat. No. 3,986,699, issued Oct. 19, 1976, discloses flanges at the opening of the seat pocket and a seat shaped to permit seepage about the sides of the seat. An O-ring overlaying the seat can be used, as in the above patents, to seal one side of the seat against transmission of fluid pressure on one side of the disc to the outer periphery of the seat.

When a valve is used in an application wherein a wide range of pressure differentials can exist between inlet and outlet passages of the valve, a problem can occur when the valve is designed for high pressure service. The construction of the valve to prevent blowout of the seat when the pressure differential between the inlet and outlet passages of the valve is relatively high can sacrifice flexibility of the seat necessary for good sealing of the valve when a lower pressure differential exists between the inlet and outlet passages.

SUMMARY OF THE INVENTION

The present invention contemplates a pressure actuated seat ring having a relatively inflexible portion and a relatively flexible portion extending therefrom and terminating in a free end. The relatively inflexible portion immobilizes the seat to prevent blowout thereof while the relatively flexible portion permits the seat to form a good seal even though a relatively low pressure differential may exist between inlet and outlet passages of the valve. In order to provide a bidirectional sealing capability, a cavity is formed about the relatively flexible portion of the seat ring and the ends of the cavity are vented to the valve chamber, containing the disc of the valve, at opposite sides of the disc. An elastomeric sealing ring extends about the flexible portion of the seat ring and is responsive to a pressure differential between the ends of the cavity to seal the vents at the low pressure end of the cavity. Thus, the higher fluid pressure at opposite sides of the disc is transmitted to the cavity and presses the relatively flexible portion of the seat ring against the disc to form a seal for the flow passage of the valve.

An object of the invention is to provide a disc valve having seats actuated by fluid pressure across the valve.

Another object of the invention is to provide a fluid pressure actuated disc valve having a bi-directional sealing capability.

A still further object of the invention is to provide a bi-directional, fluid actuated disc valve, suitable for relatively high pressure service, which has good sealing characteristics when a relatively low pressure differential exists between the inlet and outlet passages of the valve.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a sectional view in side elevation of a disc valve constructed in accordance with the present invention and showing the disc in the closed position thereof.

FIG. 2 is a sectional view in side elevation of the valve of FIG. 1 showing the disc in the open position.

FIG. 3 is a rear elevational view of a portion of the seat ring of the valve shown in FIGS. 1 and 2.

FIG. 4 is a cross-section of a portion of the seat ring shown in FIG. 3.

FIG. 5 is a front elevational view of a portion of the seat ring shown in FIGS. 3 and 4.

FIG. 6 is a partial cross-section of a valve showing a second embodiment of the seat ring.

FIG. 7 is a partial cross-section of a valve showing a third embodiment of the seat ring.

FIG. 8 is a partial cross-section of a valve showing a fourth embodiment of the seat ring.

FIG. 9 is a rear elevational view of a portion of the seat ring of FIG. 8.

FIG. 10 is a cross-section of a portion of the seat ring of FIGS. 8 and 9.

FIG. 11 is a front elevational view of a portion of the seat ring of FIGS. 8 through 10.

FIG. 12 is a partial cross-section of a valve showing a fifth embodiment of the seat ring and showing the configuration of the elastomeric sealing ring of such embodiment in response to a higher pressure at the first vent of the seat ring.

FIG. 13 is a partial cross-section of the valve shown in FIG. 12 showing the configuration of the elastomeric sealing ring in response to a higher fluid pressure at the second vent of the seat ring.

FIG. 14 is a rear elevational view of a portion of the seat ring shown in FIG. 13.

FIG. 15 is a cross-section of a portion of the seat ring shown in FIGS. 13 and 14.

FIG. 16 is a front elevational view of a portion of the seat ring shown in FIGS. 12 through 15.

FIG. 17 is a sectional view in side elevation of a fire safe disc valve constructed to incorporate the present invention and showing the valve in the closed position.

FIG. 18 is a sectional view in side elevation of the valve of FIG. 17 showing the disc in the open position.

FIG. 19 is a sectional view in side elevation of the valve of FIGS. 17 and 18 showing the sealing of the valve for the case wherein the seat ring has been destroyed.

DESCRIPTION OF FIGS. 1 THROUGH 5

Referring now to the drawings in general and to FIGS. 1 and 2 in particular, shown therein and designated by the general reference numeral 20 is a disc valve constructed in accordance with the present invention. The valve 20 generally comprises a valve body 22 having a circular valve chamber 24 formed therein and extending between a first side 26 and a second side 28 of the valve body 22.

A groove 30, having a generally rectangular cross-section, is formed in the valve body 22 and extends circumferentially about the valve chamber 24 to provide a pocket for a seat ring 32 such as the seat ring shown in FIGS. 3, 4 and 5. The groove 30 is defined by: a first annular planar wall 34 near the first side 26 of the valve body 22; a second annular planar wall 36 generally parallel to the first annular planar wall 34 and displaced therefrom toward the second side 28 of the valve body; and a cylindrical outer periphery 38 meeting the walls 34 and 36 substantially perpendicularly and extending therebetween.

FIGS. 1 and 2 show a convenient manner for forming the groove 30 in the valve body 22. As shown therein, the valve body 22 comprises a body member 40 extending between the sides 26, 28 of the valve body 22 and having a counter bore 42 formed in the side thereof adjacent the first side 26 of the valve body 22 and extending circumferentially about the valve chamber 24. The counter bore 42 terminates in an annular planar face 44 and a portion of the face 44 adjacent the valve chamber 24 forms the second wall 36 of the groove 30. An annular seat retaining ring 46, secured within the counter bore 42 in any convenient manner, is counter bored in the face thereof engaging the face 44 of the body member 40 to form the first wall 34 and the periphery 38 of the groove 30.

A stem bore 48 is formed through a portion of the body member 40 of the valve body 22 between the groove 30 and the second end 28 of the valve body 22. The stem bore 48 extends radially from the valve chamber 24 to intersect the exterior surface of the valve body 22. Diametrically opposite the stem bore 48, with respect to the valve chamber 24, a cylindrical recess 50 is formed in the body portion 22 coaxially with the stem bore 48. A disc support shaft 52 is mounted in the valve body 22 with a medial portion of the disc support shaft 52 extending across the valve chamber 24. That is, a portion of the disc support shaft 52 adjacent the upper end 54 thereof is disposed in the stem bore 48 and a portion of the disc support shaft 52 adjacent the lower end 56 thereof is disposed in the recess 50. An operating stem 58 is mounted in the stem bore 48 above the shaft 52 and protrudes from the valve body 22 so that the operating stem 58 can be turned in the stem bore 48 via a wrench or the like engaging portions of the operating stem 58 disposed exteriorly to the valve body 22. A slot 60 is formed in the end of the operating stem 58 adjacent the shaft 52 and mates with a key 62 formed on the upper end 54 of the shaft 52 such that a rotation of the operating stem 58 effects a rotation of the shaft 52.

The valve 20 includes a disc 64 mounted on the portion of the disc support shaft 52 extending across the valve chamber 24 via a mounting bracket 66 formed on one face 68 of the disc 64. The bracket 66 offsets the disc 64 from the axis of the shaft 52 and the amount of offset is selected such that the disc 64 is aligned with the groove 30 formed in the valve body 22 when the disc 64 is turned, via the operating stem 58, to a closed position wherein the disc 64 is faced toward the first side 26 of the valve body 22. (see FIG. 1.) The outer periphery 70 of the disc 64 is shaped to conform to a portion of a spherical surface centered on the intersection of the axes of the valve chamber 24 and the disc support shaft 52 to form a sealing surface on the disc 64.

The seat ring 32 is preferably constructed of a yieldable polymeric material, such as polytetrafluoroethylene or the like, and the seat ring 32 is disposed in the groove 30 in the assembled valve 20 as has been shown in FIGS. 1, 2 and 4. (For clarity of illustration, the features of the seat ring 32 have not been numerically designated in FIGS. 1 and 2. Rather, FIGS. 3, 4 and 5 have been provided to point out the construction of the seat ring 32.) A sealing surface 72, shaped to mate with the outer periphery 70 of the disc 64 is formed on the inner periphery, generally designated 74, of the seat ring 32 and the sealing surface 72 engages the periphery 70 of the disc 64 in the closed position thereof to form an obstruction across the valve chamber 24 when the valve 20 is closed. In particular, the disc 64 and the seat ring 32 divide the valve chamber 24 into a first passage 76, generally adjacent the first side 26 of the valve body 22, and, on the opposite side of the disc 64, a second passage 78, generally adjacent the second side 28 of the valve body 22. As will be discussed below, the valve 20 is bi-directional. That is, either passage 76, 78 can be an inlet passage for the valve 20 and either passage 76, 78 can be an outlet passage for the valve. One side of the groove 30, adjacent the first wall 34, communicates with the first passage 76 of the valve chamber 24 in the closed position of the disc 64 while the opposite side of the groove 30, adjacent the second wall 36, communicates with the second passage 78 of the valve chamber 24.

Referring specifically to FIGS. 3, 4 and 5, the seat ring 32 has a generally "L"-shaped cross-section. That is, the seat ring 32 comprises a first portion 80, forming the vertical leg of the "L", and a second portion 82 joining the first portion 80, at the inner periphery 74 of the seat ring 32 and extending generally axially therefrom to form the horizontal leg of the "L". The sealing surface 72 is formed on the second portion 82 and is positioned such that an exterior face 84 of the first portion 80 of the seat ring 32 abuts the first wall 34 of the groove 30 when the sealing surface 72 engages the periphery 70 of the disc 64. The axial width of the seat ring 32 is slightly less than the axial width of the groove 30 so that, in the closed position of the disc 64, the second portion 82 of the seat ring 32 terminates in a free end 86 displaced slightly from the second wall 36 of the groove 30. (The spacing between the free end 86 and the second wall 36 has been exaggerated in the drawings.)

The diameter of the outer periphery 88 of the first portion 80 of the seat ring 32 is substantially the same as the diameter of the outer periphery 38 of the groove 30 while the diameter of the outer periphery 90 of the second portion 82 of the seat ring 32 is smaller than the diameter of the outer periphery 38 of the groove 30 so that an annular cavity 92 is formed about the second portion 82 of the seat ring 32. Specifically, the cavity 92 is defined by: an interior face 94 of the first portion 80 of the seat ring 32, from which the second portion 82 of the seat ring 32 extends; the second wall 36 of the groove 30; the outer periphery 38 of the groove 30; and the outer periphery 90 of the second portion 82 of the seat ring 32. The axial width of the second portion 82 of the seat ring 32 is greater than the difference in diameters of the outer peripheries, 88 and 90 respectively, of the first portion 80 and second portion 82 of the seat ring 32 so that the axial width of the cavity 92 is greater than the radial width thereof.

An O-ring 96, constructed of an elastomeric material such as rubber, is disposed in the cavity 92 and extends circumferentially about the second portion 82 of the seat ring 32. The width of the O-ring 96 is selected to be slightly greater than the radial width of the cavity 92 but less than the axial width thereof. Thus, the O-ring 96 forms a seal between the seal ring 32 and the valve body 22 and the O-ring 96 can displace axially along the second portion 82 of the seat ring 32 in response to a pressure differential at opposite ends of the cavity 92. The purpose of the axial displacement of the O-ring 96 will be discussed below.

A plurality of passageways 98 in the form of holes formed through the first portion 80 of the seat ring 32 provide a first vent between the cavity 92 containing the O-ring 96 and the first passage 76 of the valve body 22. Specifically, the passageways 98 extend from the inner periphery 74 of the seat ring 32 to approximately the intersection of the interior face 94 of the first portion 80 of the seat ring 32 with the outer periphery 90 of the second portion 82 of the seat ring 32 such that the first vent opens into one end of the cavity 92. The spacing between the free end 86 of the second portion 82 of the seat ring 32 provides a second vent extending between the opposite end of the cavity 92 and the second passage 78 of the valve body 22.

OPERATION OF FIGS. 1 THROUGH 5

The above recited construction of the valve 20 provides the valve 20 with a pressure-actuated, bi-directional sealing capability as will now be described. Initially, it will be noted that fluid pressures in the first and second passages 76 and 78 of the valve body 22 are transmitted to opposite ends of the cavity 92 so that, should a pressure differential exist between the passages 76 and 78, a similar pressure differential will exist axially across the O-ring 96. Thus, should the valve 20 be closed by placing the disc 64 in the closed position shown in FIG. 1 while the second passage 78 communicates with upstream pressure and while the first passage 76 communicates with downstream pressure, the O-ring 96 will be forced against the shoulder formed by the intersection of the interior face 94 of the first portion 80 of the seat ring 32 and the outer periphery 90 of the second portion 82 thereof. Such position for the O-ring 96 has been shown in FIG. 1. When the O-ring 96 is positioned as shown in FIG. 1 and when a higher pressure exists in the second passage 78 than in the first passage 76, the O-ring will overlay the first vent formed by the passageways 98 to seal the first vent at the inlet of the first vent to the cavity 92. Accordingly, upstream pressure will be transmitted either directly or via portions of the O-ring 96 to substantially the entire outer periphery 90 of the second portion 82 of the seat ring 32.

Conversely, the fluid pressure at the sealing surface 72 formed on the inner periphery 74 of the seat ring 32 will vary from upstream pressure, where the sealing surface 72 meets the second passage 78 of the valve body 22, to downstream pressure, where the sealing surface 72 meets the first passage 76, such that an average pressure lower than upstream pressure is exerted on the sealing surface 72. Accordingly, a net radially inwardly directed force will be exerted on the second portion 82 of the seat ring 32. The construction of the seat ring 32 with an "L"-shaped cross-section results in a relatively large radial width for the first portion 80 thereof such that the first portion 80 is relatively inflexible with regard to radially inward displacement. Accordingly, the first portion 80 of the seat ring 32 provides a relatively fixed support for the end of the second portion 82 joined to the first portion 80. Since the second portion 82 is unsupported at the free end 86 thereof, the second portion 82 is relatively flexible and will flex radially inwardly in the manner of a cantilever subjected to a transverse load to force the sealing surface 72 against the outer periphery 70 of the disc 64, whereby the valve 20 is sealed against fluid flow.

It is particularly noted that the construction of the seat ring 32 to include a relatively inflexible portion and a relatively flexible portion whereon a sealing surface is formed permits the valve 20 to be used for both high pressure and low pressure service. The relatively large radial width of the first portion 80 of the seat ring 32 provides the seat ring 32 with an overall inflexible character to prevent blowout of the seat ring 32 from the groove 30 during high pressure service while the support of the second portion 82 of the seat ring 32 at only one end thereof permits the seat ring 32 to affect a tight seal against the disc 64 during low pressure service of the valve 20.

The sealing of the valve 20 when the first passage 76 of the valve body 22 is upstream of the second passage 78 differs from the above description of the operation of the valve 20 only in the manner in which upstream fluid pressure is transmitted to the outer periphery 90 of the second portion 82 of the seat ring 32. When the disc 64 is placed in the closed position with the first passage 76 of the valve body 22 upstream of the second passage 78, a higher fluid pressure is transmitted to the end of the cavity 92 adjacent the first vent formed by the passageways 98 so that the O-ring is forced against the shoulder formed by the outer periphery 90 of the second portion 82 of the seat ring 32 and the second wall 36 of the groove 30. In such position, shown in FIG. 4, the O-ring 96 overlays the second vent at the free end 86 of the second portion 82 of the seat ring 32 to affect a seal between the cavity 92 and the second passage 78 of the valve body 22 at the free end 86 of the second portion 82 of the seat ring 32. The first vent will remain open to the cavity 92 so that substantially the entire outer periphery 90 of the second portion 82 of the seat ring 32 is again subjected, either directly or via portions of the O-ring 96, to upstream pressure.

DESCRIPTION OF FIG. 6

FIG. 6 illustrates a second embodiment of a seat ring, generally designated 32a, for a valve 20a constructed in accordance with the present invention. In the embodiment shown in FIG. 6, an axially extending tubular lip 100 is formed on the first portion 80a of the seat ring 32a and extends axially across the groove 30 about the second portion 82a of the seat ring 32a to contribute to the inflexibility of the first portion 80a. The outer periphery 102 of the lip 100 abuts the outer periphery 38 of the groove 30 and the inner periphery 104 of the lip 100 is radially spaced from the outer periphery 90a of the second portion 82a of the seat ring 32a such that the cavity 90a about the second portion 82a is formed between the lip 100 and the second portion 82a.

As shown in FIG. 6, the exterior face 84a of the first portion 80a of the seat ring 32a can abut the second wall 36 of the groove 30, rather than the first wall 34 thereof, such that the second portion 82a of the seat ring 32a extends away, rather than toward, the disc support shaft 52. It is convenient where the first portion 80a of the seat ring 32a abuts the second wall 36 of the groove 30 and where the first portion 80a is provided with the tubular lip 100 to construct the second portion of the seat ring in the form of a frustum converging toward the free end 86a of the second portion 82a of the seat ring 32a such that the second portion 82a is approximately parallel to the outer periphery 70 of the disc 64. It will also be noted the vent passageways 98 are formed through the portion 82a adjacent the portion 80a.

FIG. 6 further illustrates a second method for forming the groove 30 in the valve body of a valve constructed in accordance with the present invention. In the valve 20a, a second counter bore 106 is formed concentrically with the counter bore 42 in portions of the body member 40a of the valve body of the valve 20a. The seat retaining ring 46a has the form of a flat ring and fits within the second counter bore 106 such that the groove 30 is defined by the counter bore 42 and one face of the seat retaining ring 46a.

The operation of the valve 20a is the same as the operation of the valve 20.

DESCRIPTION OF FIG. 7

FIG. 7 illustrates a third embodiment of a seat ring, generally designated 32b, for a valve 20b constructed in accordance with the present invention. The diameter of the outer periphery 88b of the first portion 80b of the seat ring 32b has a slightly smaller diameter than the outer periphery 38 of the groove 30 such that the outer periphery 88b is spaced a slight distance from the outer periphery 38 of the groove 30. The sealing surface 72b on the second portion 82b of the seat ring 32b is positioned such that, in the absence of a pressure differential across portions of the seat ring 32b, the exterior face 84b of the first portion 80b is spaced a distance from the first wall 34 of the groove 30 when the sealing surface 72b engages the outer periphery 70 of the disc 64. Thus, the first vent to the end of the cavity 92b adjacent the first portion 80b of the seat ring 32b is formed by the spacing between the exterior face 84b of the seat ring 32b and the first wall 34 of the groove 30 and by the spacing between the outer peripheries 38 and 88b of the groove 30 and the first portion 80b of the seat ring 32b respectively. (The spacings defining the first vent have been exaggerated in FIG. 7.) Since the first vent is formed by spacings between the first portion 80b of the seat ring 32b and the groove 30, passageways such as the passageways 98 forming the first vent in the seat ring 32 are not required for the seat ring 32b and have accordingly been eliminated in the seat ring 32b. The second vent is formed in the same manner that the second vent is formed in the valve 20.

The operation of the valve 20b is substantially the same as the operation of the valve 20 previously described. It is noted that when a higher pressure exists at the second vent adjacent the second wall 36 of the groove 30, the seat ring 32b is shifted toward the first side 26 of the valve 20b such that the exterior face 84b of the first portion 80b of the seat ring 32b abuts the first wall 34 of the groove 30. The spacings defining the first vent are made small in order that such shifting of the seat ring 32b will not interfere with the urging of the sealing surface 72b against the outer periphery 70 of the disc 64 in response to upstream pressure in the cavity 92b.

DESCRIPTION OF FIGS. 8 THROUGH 11

FIGS. 8 through 11 illustrate a fourth embodiment of a seat ring, generally designated 32c, for a valve 20c constructed in accordance with the present invention. In particular, FIGS. 8 through 11 show a different manner of forming the vents to the cavity 90c.

In the valve 20c, the exterior face 84c and the outer periphery 88c of the first portion 80c of the seat ring 32c abut the first wall 34 and the outer periphery 38 respectively of the groove 30. As is particularly shown in FIGS. 9 and 10, the first vent is formed by a plurality of passageways 98c, having the form of channels formed in the exterior face 84c and the outer periphery 88c of the first portion 80c of the seat ring 32c, the channels extending along the first wall 34 and a portion of the outer periphery 38 of the groove 30. Accordingly, passageways in the form of holes through the first portion 80c of the seat ring 32c are unnecessary and are eliminated in the seat ring 32c. Moreover, the free end 86c of the second portion 82c of the seat ring 32c loosely abuts the second wall 36 of the groove 30 and, as is more particularly shown in FIGS. 10 and 11, a plurality of channels 106 is formed in the free end 86c of the second portion 82c of the seat ring 32c to form the second vent. The operation of the valve 20c is the same as the operation of the valve 20.

DESCRIPTION OF FIGS. 12 THROUGH 16

Referring now to FIGS. 12 through 16, shown therein and designated by the general reference numeral 32d, is another embodiment of a seat ring for a valve 20d constructed in accordance with the present invention. The valve 20d shows an alternative to the O-ring 96 for sealing one of the first and second vents to the cavity overlaying the second portion 82d of the seat ring 32d in response to a pressure difference at the vents. (The cavity has not been numerically designated in FIGS. 12 through 16.)

Referring specifically to FIGS. 15 and 16, the valve 20d includes a deformable elastomeric sealing member 108 which is attached to the seat ring 32d via any suitable adhesive. Specifically, a first end 110 of the sealing ring 108 is adhered to the interior face 94d of the first portion 80d of the seat ring 32d and the inner periphery 112 of the sealing member 108 is adhered to the outer periphery 90d of the second portion 82d of the seat ring 32d. The sealing member 108 extends circumferentially about the second portion 82d of the seat ring 32d and is slightly wider axially than the second portion 82d of the seat ring 32d . Thus, a second end 114 of the sealing member 108, opposite the first portion 80d of the seat ring 32d, protrudes a short distance beyond the free end 86d of the second portion 82d of the seat ring 32d. A portion of the sealing member 108 generally adjacent the first portion 80d of the seat ring 32d is formed on a diameter substantially the same as the diameter of the outer periphery 88d of the first portion 80d of the seat ring 32d. The remaining portion of the sealing member 108, adjacent the second end 114 thereof and overhanging the free end 86d of the second portion 82d of the seat ring 32d, is formed on a diameter slightly larger than the diameter of the outer periphery 88d of the first portion 80d in the seat ring 32d for a purpose to be described below.

A plurality of passageways 98d are formed in the exterior face 84d of the first portion 80d of the seat ring 32d as is particularly shown in FIGS. 14 and 15. Each passageway 98d has the form of a channel cut in the exterior face 84d and extends radially across the exterior face 84d.

Referring now to FIGS. 12 and 13, the axial width of th seat ring 32d is slightly less than the width of the groove 30 and the exterior face 84d of the first portion 80d of the seat ring 32d abuts the first wall 34 of the groove 30 so that the second vent to the cavity overlaying the second portion 82d of the seat ring 32d is formed by a spacing between the free end 86d and the second portion 82d of the seat ring 32d and the second wall 36 of the groove 30. The diameter of the outer periphery 88d of the first portion 80d of the seat ring 32d is slightly smaller than the diameter of the outer periphery 38 of the groove 30 so that an annular space is formed between the outer peripheries 88d and 38. This space communicates with the passageways 98d in the exterior face 84d of the first portion 80d of the seat ring 32d to form the first vent to the cavity overlaying the second portion 82d of the seat ring 32d.

As shown in FIGS. 12 and 13, the second end 114 of the sealing member 108 engages the second wall 36 of the groove 30 and the enlarged portion of the sealing ring 108 adjacent the second end 114 engages the outer periphery 38 of the groove 30 such that the sealing member 108 substantially fills the cavity overlaying the second portion 82d of the seat ring 32d. Thus, the higher pressure in one of the first and second vents is transmitted indirectly to the outer periphery 90d of the second portion 82d of the seat ring 32d via the sealing member 108 as will now be explained.

When the fluid pressure at the first vent, formed by the passageways 98d and the spacing between the outer peripheries 38 and 88d of the groove 30 in the first portion 80d of the seat ring 32d respectively, is greater than the fluid pressure at the second vent, formed by the spacing between the second wall 36 of the groove 30 and the free end 86d of the second portion 82d of the seat ring, the sealing member 108 is deformed substantially as has been indicated in FIG. 12. Specifically, portions of the sealing member 108 near the first vent are forced away from the first vent while portions of the sealing member 108 near the second vent are forced partially into the second vent such that the seal between upstream and downstream fluid pressures, within the cavity overlaying the second portion 82d of the seat ring 32d, is formed at the second vent. Thus, upstream pressure is transmitted through the sealing member 108 to the outer periphery 90d of the second portion 82d of the seat ring 32d. As has been previously discussed, transmission of upstream pressure to the outer periphery 90d of the second portion 82d of the seat ring 32d forces the second portion 82d against the outer periphery 70 of the disc 64.

When the second vent is exposed to the larger pressure, the sealing ring 108 is deformed substantially as has been indicated in FIG. 13. That is, portions of the sealing ring 108 near the second vent are forced away therefrom while portions of the sealing ring 108 near the first vent are urged against the outer periphery 38 of the groove 30 to form a seal between upstream and downstream pressure, in the cavity overlaying the second portion 82d of the seat ring 32d, near the first vent. Thus, upstream pressure is again transmitted via the sealing ring 108 to substantially the entire outer periphery 90d of the second portion 83d of the seat ring 32d .

Referring once again to FIG. 15, the seat ring 32d can include elastomeric sealing rings, 118 and 120, adhered to the inner periphery 74d of the seat ring 32d and disposed to either side of the sealing surface 72d. The sealing rings 118 and 120 enhance the sealing between the seat ring 32d and the disc 64 in the usual manner.

DESCRIPTION OF FIGS. 17, 18 and 19

FIGS. 17, 18 and 19 illustrate a modification of a valve, generally designated 20e and containing a seat ring 32e similar to the seat ring 32, to provide a fire safe sealing capability for one direction of fluid flow through the valve 20e in the manner disclosed in my aforementioned, co-pending U.S. Patent Application, Ser. No. 865,853. In particular, the valve 20e provides a fire safe capability for fluid flow in the direction 130 from the second side 28 of the valve body 20e to the first side 26 thereof.

In the valve 20e, the groove 30 is formed in the same manner in which the groove 30 is formed in the valve 20. That is, the seat retaining ring 46e is counter bored in the face thereof engaging the face 44 of the counter bore 42 in the body member 40e such that the first wall 34 and outer periphery 38 of the groove 30 are formed in the retaining ring 46e. A lip 132 is formed on the first wall 34 of the groove 30 adjacent the valve chamber 24 such that the lip 132 extends circumferentially about a portion of the inner periphery 74e of the seat ring 32e. A secondary seat 134, shaped to mate with the sealing surface 70 of the disc 64 is formed on the lip 132 and, in normal operation of the valve 22e, the secondary seat 134 is positioned a preselected distance from the sealing surface 70 toward the first side 26 of the valve body 22e. The first portion 80e of the seat ring 32e engages the lip 132 and extends radially along the first wall 34 of the groove 30 from the lip 132 to the outer periphery 38 of the groove 30. Passageways 98e, in the form of holes passing through the second portion 82e of the seat ring 32e, form the first vent and the second vent is formed in the same manner as in the valve 20 such that the sealing of the valve 20e under normal conditions occurs as described above for the valve 20.

A portion 136 of the stem bore 48e adjacent the valve chamber 24 is formed on an enlarged diameter and a cylindrical bushing 138 is disposed in the enlarged portion 136 of the stem bore 48e to receive portions of the disc support shaft 52 near the upper end 54 of the shaft 52. Similarly, the recess 50e, diametrically opposed to the stem bore 46e, is formed on an enlarged diameter and a cylindrical bushing 140 is disposed in the recess 50e to receive portions of the disc support shaft 52 near the lower end 56 thereof. The bushings 138 and 140 are formed of an organic polymer such that the bushings will be destroyed in the event a fire envelopes the valve 20e and the annular thickness of each bushing 138, 140 is slightly greater than the spacing between the secondary seat 134, formed on the lip 132 on the first wall 34 of the groove 30, and the periphery 70 of the disc 74.

A portion 142 of the operating stem 58e, adjacent the upper end 54 of the disc support shaft 52, is enlarged to mate with the enlarged portion 136 of the stem bore 48e and the operating stem 58e is keyed to the disc support shaft 52 in the same manner as in the valve 20. That is, a slot 60 is formed on the end of the operating stem 58e adjacent the disc support shaft 52 and a key 62 is formed on the upper end 54 of the disc support shaft 52 and extends into the slot 60. The slot 60 and key 62 are substantially perpendicular to the disc 64 such that the slot 60 and key 62 are aligned axially with the valve chamber 24 when the disc 64 is in the closed position.

In the event that a fire envelopes the valve 20e, while the disc 64 is in the closed position shown in FIGS. 17 and 19, such that the seat ring 32e is destroyed, the bushings 138 and 140 will similarly be destroyed such that the axial support of the disc support shaft 52 and the disc 64 with respect to the valve body 22e is eliminated. Thus, in response to fluid pressure in the direction 130 toward the first side 26 of the valve body 22e, the key 62 on the upper end 54 of the disc support shaft 52 will slide in the slot 60 in the operating stem 58 to permit the disc to be displaced toward the first side 26 of the valve body 22e and, accordingly, toward the secondary seat 134. Since the annular thickness of each of the bushings 138 and 140 is greater than the spacing between the secondary seat 134 and the periphery 70 of the disc 64, the disc 64 will be axially displaced along the valve body 22e a sufficient distance for the periphery 70 of the disc 64 to engage the secondary seat 134 to close the valve 20e.

It is clear that the present invention is well adapted to carry out the objects and obtain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. In a valve including a valve body having a valve chamber therein containing a valve disc adapted to be turned between open and closed positions, and an annular groove in the valve body surrounding the valve chamber opposite the outer periphery of the disc when the disc is in the closed position, the improvement comprising:

a seat ring in said groove having a first portion relatively inflexible so as to maintain the seat ring in position within said groove and a second relatively flexible portion formed as one piece with the first portion and extending generally axially from the first portion, the second portion terminating in an unsupported free end such that the first portion of the seat ring provides support for one end of the second portion thereof and the other end of the second portion of the seat ring is unsupported against radial contraction, and wherein the second portion has an outer diameter less than the diameter of said groove to form a cavity around the second portion;

first means forming a first vent between the valve chamber at one side of said groove and said cavity at one end of the relatively flexible portion of the seat;

second means forming a second vent between the valve chamber at the opposite side of said groove and said cavity at the opposite end of the relatively flexible portion of the seat; and elastomeric means in said cavity for closing the first vent when the second vent is exposed to the higher pressure and for closing the second vent when the first vent is exposed to the higher pressure so that the larger fluid pressure exerted at either side of the disc with the disc in a closed position is transmitted to said cavity to force the relatively flexible portion of the seat ring against the disc.

2. The valve of claim 1 wherein the seat ring is characterized as having a generally L-shaped cross-section, the first portion of the seat ring extending generally radially with respect to the valve body so as to form one leg of the L and the second portion of the seat ring extending axially therefrom so as to form the other leg of the L; and wherein the second portion of the seat ring joins the first portion adjacent the inner periphery of the first portion.

3. The valve of claim 2 wherein the outer periphery and one side of the first portion of the seat ring abut portions of the valve body defining the groove formed therein and wherein at least one passageway is formed in the first portion of the seat ring to form the first vent.

4. The valve of claim 3 wherein each passageway is characterized as being a hole formed through the first portion of the seat ring and communicating with the cavity about the second portion of the seat ring substantially at the intersection of said first and second portions.

5. The valve of claim 3 wherein each passageway is characterized as being a channel formed in surfaces of the first portion of the seat ring abutting the valve body.

6. The valve of claim 2 wherein the free end of the second portion of the seat ring is spaced from portions of the valve body defining the groove therein to form the second vent.

7. The valve of claim 3 or claim 4 wherein the second portion of the seat ring terminates in a free end opposite the first portion of the seat ring, said free end being spaced from portions of the valve body defining the groove therein to form the second vent.

8. The valve of claim 2 wherein the distal end of the second portion of the seat ring opposite the first portion of the seat ring abuts portions of the valve body defining the groove and wherein at least one channel is formed in said distal end to form the second vent.

9. The valve of claim 3 or claim 5 wherein the distal end of the second portion of the seat ring opposite the first portion of the seat ring abuts portions of the valve body defining the groove and wherein at least one channel is formed in said distal end to form the second vent.

10. The valve of claim 2 wherein the outer periphery of the first portion of the seat ring has a diameter less than the outer diameter of the groove in the valve body and wherein the axial width of the seat ring is less than the axial width of the groove such that spaces between the seat ring and the valve body form the first and second vents.

11. The valve of claim 1, 2, 3, 4, 5, 6, 8 or 10 wherein the elastomeric means is characterized as being an O-ring disposed in the cavity about the second portion of the seat ring and extending circumferentially about said second portion, the O-ring engaging the outer peripheries of the second portion of the seat ring and the groove in the valve body and the O-ring having a diameter less than the axial width of said cavity, whereby the O-ring shifts axially along said second portion in response to a pressure differential at the first and second vents to seal one of the first vents and the second vents.

12. The valve of claim 1 wherein the first portion of the seat ring has an axially extending tubular lip abutting the outer periphery of the groove and extending thereacross, said tubular lip overlaying the second portion of the seat ring and spaced a distance therefrom, whereby the elastomeric means is disposed in the spacing between said tubular lip and the second portion of the seat ring.

13. The valve of claim 2 wherein the elastomeric means comprises a deformable annular sealing member disposed in the cavity formed about the second portion of the seat ring and extending circumferentially about said second portion; wherein the sealing member is adhered to the first and second portions of the seat ring and extends therefrom to portions of the valve body defining the groove; and wherein the sealing member deforms in response to a pressure differential between the first and second vents to seal one of the first and second vents.

14. The valve of claim 1, 2, or 13 wherein a circumaxial sealing surface is formed on the disc and a mating circumaxial sealing surface is formed on the inner periphery of the second portion of the seat ring; and wherein the seat ring comprises at least one sealing ring adhered to the inner periphery of the second portion of the seat ring adjacent the sealing surface formed thereon to sealingly engage the sealing surface on the disc in the closed position of the disc.

15. The valve of claim 1 wherein the valve comprises fire destructable packing means, supported by the valve body, for supporting the disc on the valve body such that the disc is axially displaceable in the valve chamber in the event said packing means is destroyed by fire; and wherein a secondary seat is formed on the valve body to engage the disc in an axially displaced condition of the disc toward one end of the valve chamber.

* * * * *